United States Patent [19]

Boyd

[11] Patent Number: 4,909,617

[45] Date of Patent: Mar. 20, 1990

[54] CAMERA HOOD WITH PIVOTING LENS CAP

[76] Inventor: Jeffrey M. Boyd, 8444 Parkdale Dr., Shreveport, La. 71108

[21] Appl. No.: 204,755

[22] Filed: Jun. 10, 1988

Related U.S. Application Data

[63] Continuation-in-part of Ser. No. 112,373, Oct. 26, 1987, abandoned.

[51] Int. Cl.$^4$ .............................................. G03B 11/04
[52] U.S. Cl. .................................. 350/580; 350/587; 350/257; 354/287
[58] Field of Search ........................ 350/257, 580, 587; 354/287

[56] References Cited

U.S. PATENT DOCUMENTS

| | | | |
|---|---|---|---|
| 2,514,257 | 7/1950 | Reavis | 350/587 |
| 2,522,897 | 9/1950 | Rotter | 350/587 |
| 2,632,252 | 3/1953 | Blais, Sr. | 350/587 |
| 2,849,795 | 9/1958 | Vissing | 350/587 |
| 2,889,629 | 6/1959 | Darkenwald | 350/587 |
| 3,840,883 | 10/1974 | Choate | 350/580 |

FOREIGN PATENT DOCUMENTS

| | | | |
|---|---|---|---|
| 761832 | 11/1956 | United Kingdom | 350/580 |
| 980588 | 3/1963 | United Kingdom | 350/257 |

*Primary Examiner*—Bruce Y. Arnold
*Assistant Examiner*—R. D. Shafer
*Attorney, Agent, or Firm*—John M. Harrison

[57] ABSTRACT

A camera hood designed to be threadably attached to the lens or lens filter of a camera and adapted for opening and closing by means of a pivoting lens cap. In a first preferred embodiment of the invention, the pivoting lens cap is secured to the hood by means of a hollow hood hinge which is fitted with a coil spring to facilitate retaining the lens cap in selectively open and closed configuration. In a second preferred embodiment the hood is slotted, in order to match and seat a companion flange provided in the lens cap when the lens cap is closed. In another preferred embodiment the hood is secured to an attachment ring in ratcheting fashion such that rotation of the hood in only one direction with respect to the attachment ring can be effected, to locate the lens cap in a desired position when the attachment ring is threaded on the camera lens and the lens cap is pivotally opened.

21 Claims, 2 Drawing Sheets

U.S. Patent   Mar. 20, 1990   Sheet 1 of 2   4,909,617
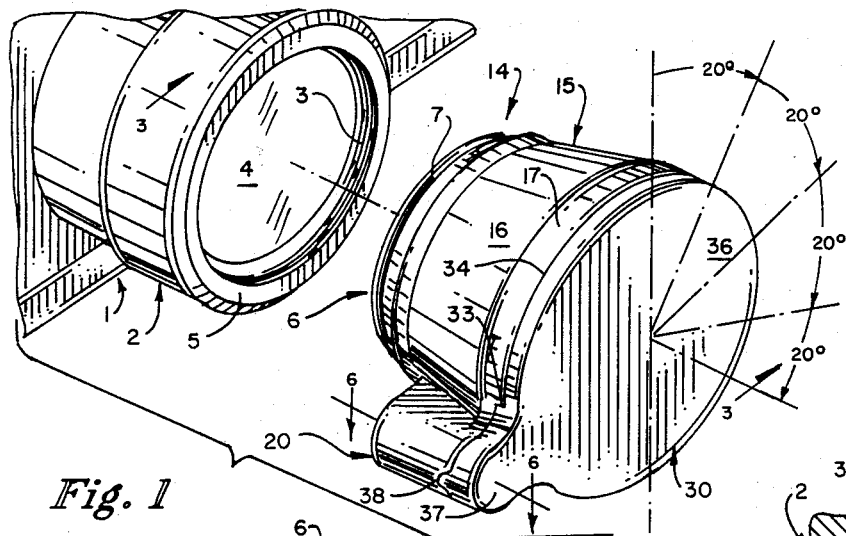
Fig. 1
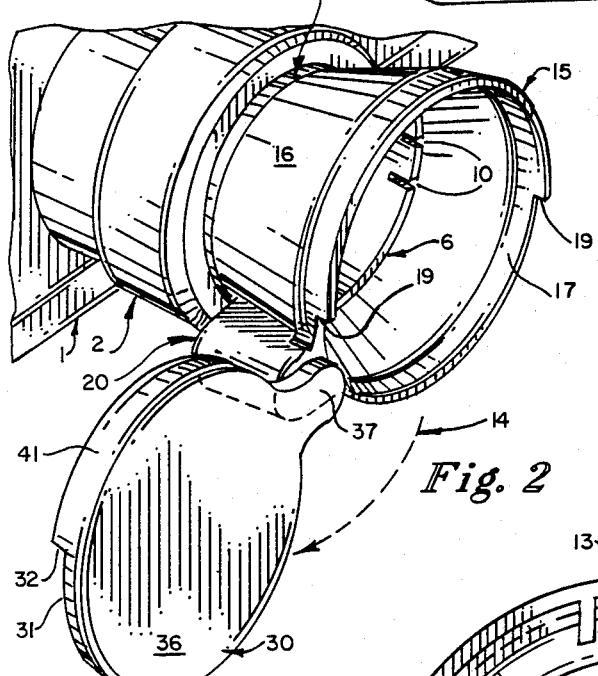
Fig. 2
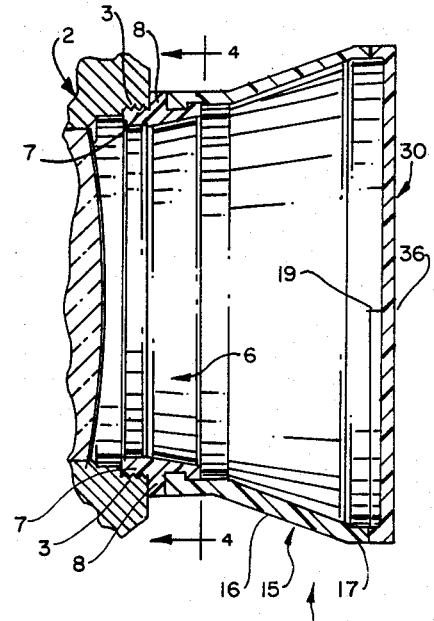
Fig. 3
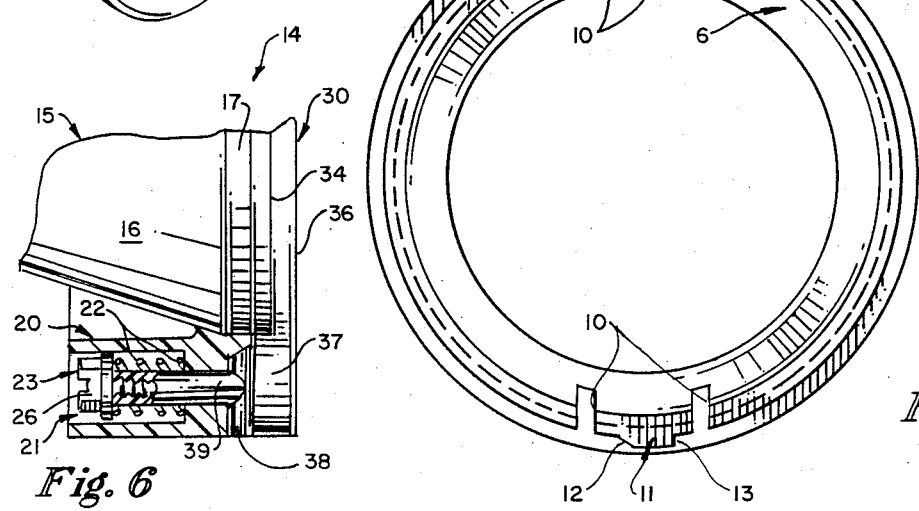
Fig. 6
Fig. 4

CAMERA HOOD WITH PIVOTING LENS CAP

CROSS-REFERENCE TO RELATED APPLICATIONS

This application is a Continuation-In-Part of my co-pending U.S. patent application Ser. No. 07/112,373, filed Oct. 26, 1987, entitled "Pivoting Hood Cap and Camera Hood" now abandoned.

BACKGROUND OF THE INVENTION

1. Field of the Invention

This invention relates to cameras and more particularly, to a camera hood which is fitted with a pivoting lens cap and a ratcheting attachment ring, with attachment ring is threadibly attached to the camera lens or lens filter. In a preferred embodiment the pivoting lens cap is provided with a flange, in order to seat in a companion slot provided in the hood and the hood is provided with a hollow spring-loaded hinge to facilitate positive, biased opennig and closing of the lens cap. The ratcheting attachment between the camera hood and the attachment ring facilitates rotation of the hood with respect to the ratchet ring and the camera lens in one direction only, in order to position the open lens cap in a configuration which does not block the view of the camera user or prevent manipulation of the camera to take pictures.

One of the problems associated with camera and filter lenses is that of accumulation of dust and other foreign matter and deposition of rain on the lenses when the camera is not in use. Furthermore, an unprotected lens is easily scratched or otherwise damaged and rendered optically unsatisfactory by various deposits thereon. Additionally, the use of an open hood to reduce glare in the taking of photographs intensifies the problem of dust, rain and foreign matter deposition and accumulation on a camera or filter lens, since the open, tapered hood acts as a funnel for the collection of foreign material on the underlying lens when the camera is carried about. The conventional camera hoods are normally maintained in an uncovered, mounted position on a camera, even under circumstances where the camera is used in a dusty environment or on a rainy day. Accordingly, application of the pivoting hood cap and camera hood of this invention is highly desirable.

2. DESCRIPTION OF THE PRIOR ART

Various types of lens caps, hoods and covers are known in the art for cameras. Most of the camera hoods are shaped from a soft rubber or plastic and are not fitted with a cap or closure. An early "Lens Shielding Attachment for Cameras" is disclosed in U.S. Pat. No. 1,283,963, dated Nov. 5, 1918, to B. N. Takahashi. The lens shielding attachment detailed in this patent includes a cylindrical holder adapted for telescoping engagement with the lens barrel, an annularly adjustable ring attached to the holder and provided with connecting means for detachably supporting a ray filter and a lens shielding disc hinged to the ring. The lens-shielding disc acts as a cover for the filter and the filter holding means when in closed position. U.S. Pat. No. 1,547,142, dated July 21, 1925, to J. J. Bausch, discloses a "Lens Frame". The lens frame detailed in this patent includes a lens seat and a split portion divided at an acute angle to the plane of the frame, in order to permit the frame to expand and facilitate holding of the lens inside the frame. A "Lens Cap for Camera" is disclosed in U.S. Pat. No. 3,682,055, dated Aug. 8, 1972, to T. Okano. The lens cap is characterized by window, through which the date or data photographing is carried by a dial or dials and can be photographed on the film of a camera with the lens cap in functional position. U.S. Pat. No. 3,942,864, dated Mar. 9, 1976, entitled "Lens Cap for Optical Instruments with Pivotally Mounted Lens Cover" has issued to Jody L. Numbers. The patent details a threadibly-mounted cap for covering the lens opening of optical instruments such as cameras, with a pivotally-mounted lens cap mounted thereon, which lens cap is spring-biased to both open and closed positions when pivotally moved beyond a given point. Another "Lens Cap" is detailed in U.S. Pat. No. 4,341,436, dated July 27, 1982, to H. Kanno. The lens cap embodied in this patent includes a disc-shaped cap body, a pair of sliding members opposed to each other on the cap body and slidable diametrically of the cap body and a biasing member for biasing the sliding members in a direction in which they are extended outwardly from the cap body. The sliding members are provided with connecting portions that engage a corresponding connecting portion provided on the inner peripheral surface of the rim of a lens barrel. The lens cap is mounted on the lens barrel by engagement between the companion connecting portions. Engaging members are provided at the opposed ends of the sliding members and the former limit the outward extension of the sliding members from the cap body against the biasing means by mutual engagement therebetween.

It is an object of this invention to provide a camera hood having a pivoting lens cap, which pivoting lens cap is designed to selectively cover and expose a camera lens or lens filter to prevent water or foreign material from accumulating on the lens or lens filter when the camera is not in use.

Another object of this invention is to provide a camera hood having a pivoting lens cap which is designed to selectively pivot into open configuration exposing the lens or lens filter, and closure on the camera hood to prevent the deposition of rain, dust or other foreign material on the underlying camera lens or lens filter.

Still another object of the invention is to provide a new and improved combination cone-shaped camera hood and pivoting lens cap, which lens cap is provided with a peripheral flange for seating on a companion peripheral slot located on the camera hood when the lens cap is in closed configuration, and wherein the lens cap is pivotal to an open configuration exposing the camera lens for taking pictures and is selectively biased in open and closed configuration by means of a coil spring mounted in a hollow hinge located on the camera hood.

A still further object of the invention is to provide a pivoting lens cap mounted on a substantially rigid, tapered camera hood, which lens cap is designed to pivot unidirectionally on the underlying hood to predetermined open and seating positions, for selectively opening and closing the camera hood and protecting the underlying lens filter or camera lens from damage or dust and water accumulation.

Yet another object of this invention is to provide a new and improved cone or funnel-shaped camera hood which is fitted with a peripheral slot and pivoting lens cap having a companion flange for engaging the slot when the lens cap is closed on the hood and further including an attachment ring provided with threads for threaded engagement with the camera lens or lens filter and projecting tabs for seating in companion slots located in the camera hood to mount the camera hood in ratcheting configuration on the attachment ring.

SUMMARY OF THE INVENTION

These and other objects of the invention are provided in a new and improved, substantially rigid camera hood having a pivoting lens cap, which pivoting lens cap is pivotally attached to and biased against a hollow hood hinge located on the rim of the camera hood. The camera hood is secured to the lens or lens filter of a camera by means of an attachment ring in ratcheting relationship, in order to selectively protect the camera lens from damage and prevent foreign matter such as dust and rain from depositing and/or accumulating on the camera lens when the lens cap is closed, and to position the lens cap in a desired location away from the viewfinder, when the lens cap is open.

BRIEF DESCRIPTION OF THE DRAWINGS

The invention will be better understood by reference to the accompanying drawings, wherein:

FIG. 1 is a perspective view of the camera hood with pivoting lens cap of this invention located in close proximity to a camera, with the pivoting lens cap in closed configuration on the camera hood;

FIG. 2 is a perspective view of the camera hood with pivoting lens cap mounted on the camera illustrated in FIG. 1 and the pivoting lens cap pivoted into the open configuration;

FIG. 3 is a sectional view of the camera hood with pivoting lens cap taken along line 3—3 in FIG. 1;

FIG. 4 is a sectional view of the camera hood with pivoting lens cap taken along line 4—4 in FIG. 3;

FIG. 6 is a sectional view of a preferred hood hinge designed to mount the pivoting lens cap on the camera hood;

DESCRIPTION OF THE PREFERRED EMBODIMENTS

Figure 5A:
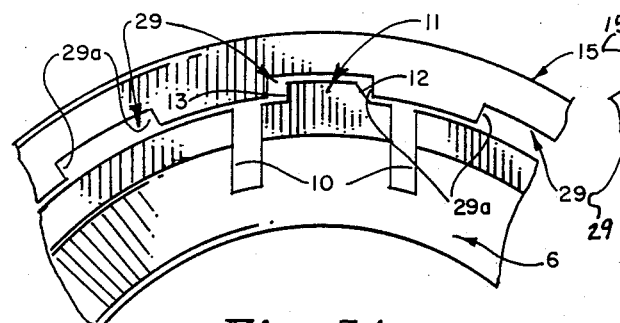
FIG. 5A is a sectional view of a preferred attachment ring and camera hood mounting configuration.
Figure 5B:
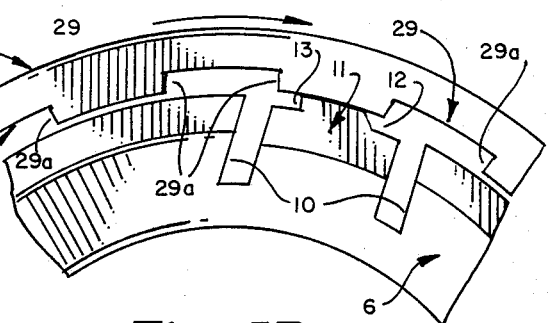
FIG. 5B is a sectional view of the attachment ring and camera hood mounting illustrated in FIG. 5A, with the camera hood rotated in the clockwise direction with respect to the attachment ring.
Figure 5C:
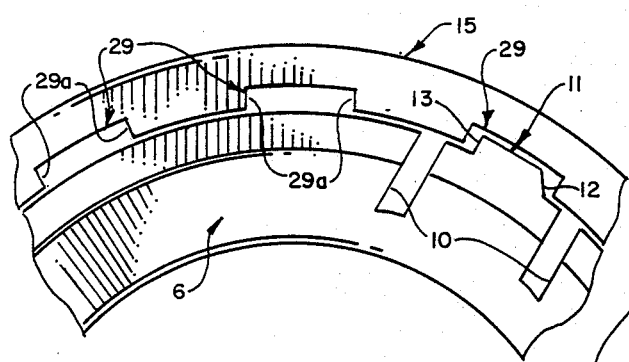
FIG. 5C is a sectional view of the attachment ring and camera hood mounting illustrated in FIGS. 5A and 5B, with the camera hood rotated further in the clockwise direction with respect to the attachment ring.

Referring initially to FIGS. 1, 3 and 6 of the drawings, the camera hood and lens cap of this invention is generally illustrated by reference numeral 14. The camera hood and lens cap 14 is characterized by a hood 15, having a tapered, cone-shaped hood body 16 and fitted with a body ring 17 to define an opening of largest diameter in the hood body 16. A hood hinge 20 is provided on the periphery of the hood body 16 and one end of the hood hinge 20 terminates at the body ring 17. An attachment ring 6 is fitted with external ring threads 7 at one peripheral edge for threadible engagement with the internal lens threads 3 of a camera lens 2 and the attachment ring 6 engages the hood body 16 in ratcheting relationship, as hereinafter further described. The camera lens 2 is conventional in design, has a lens window 4 and is mounted on a camera 1 in conventional fashion. The attachment ring 6 is further characterized by a ring shoulder 8, which is located at the base of the lens threads 3 and seats against the lens face 5, illustrated in FIG. 1, when the attachment ring 6 is threadibly attached to the camera lens 2, as illustrated in FIG. 2.

Figure 7:
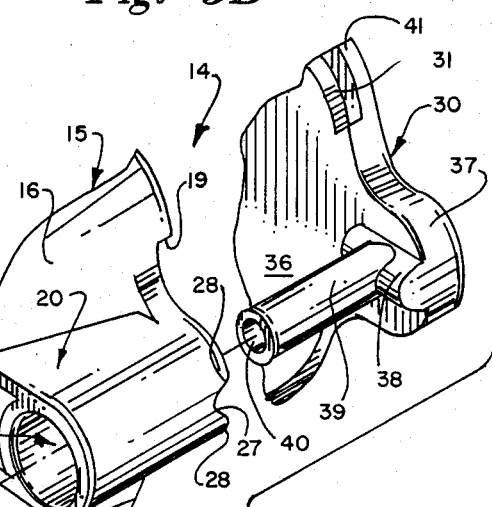
FIG. 7 is an exploded view, partially in section, of the hood hinge illustrated in FIG. 6.
Figure 8A:
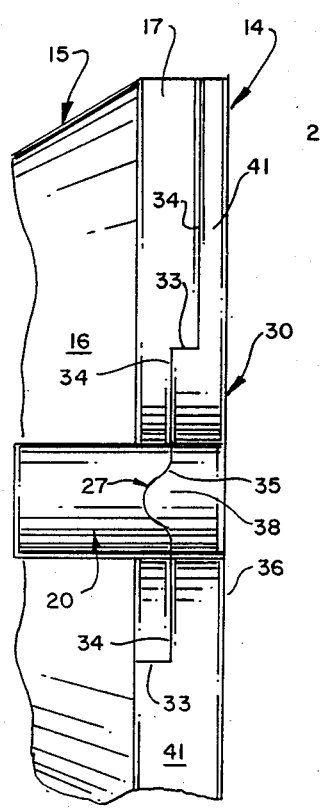
FIG. 8A is a side view, partially in section, of the camera hood and hood hinge with the pivoting lens cap in closed configuration as illustrated in FIG. 1.
Figure 8B:
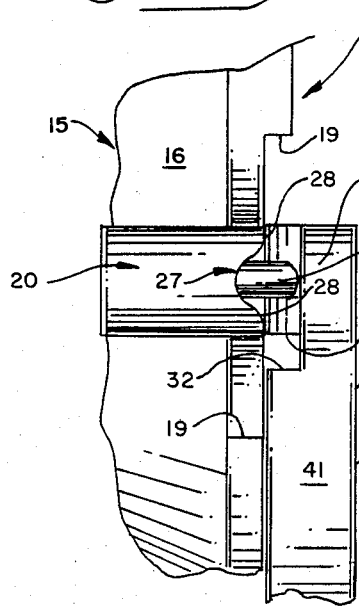
FIG. 8B is a side view, partially in section, of the camera hood and hood hinge with the pivoting lens cap rotated and displaced 90 degrees with respect to the hood.
Figure 8C:
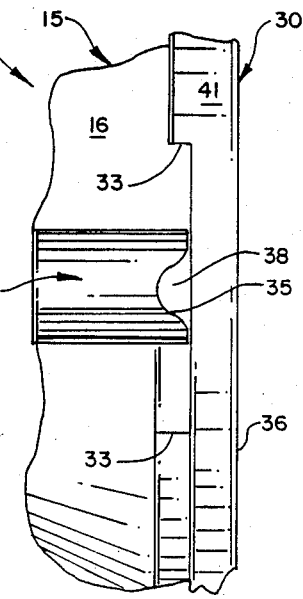
FIG. 8C is a side view, partially in section, of the camera hood and hood hinge with the pivoting lens cap rotated and displaced 180 degrees from the position illustrated in FIG. 8A.

Referring now to FIGS. 6 and 7 of the drawings, in a preferred embodiment of the invention the generally cylindrically-shaped hood hinge 20 is further characterized by a hinge bore 21 which receives a coil spring 22 and is designed to further receive a tab mount 39, projecting from one edge of a hinge plate 37 shaped in the lens cap 30. The tab mount 39 is designed to fit inside the spring 22 in the hinge bore 21 and is provided with a tab mount bore 40, in order to receive the screw threads 25 of a screw 23, having a head flange 24, and maintain the tab mount 39 in assembled configuration inside the hinge bore 21, as illustrated in FIG. 6. The screw threads 25 of the screw 23 are tightly driven into the tab mount bore 40 of the tab mount 39 by fitting the flat blade of a screwdriver (not illustrated) into the slotted head 26 of the screw 23 in conventional fashion. In a most preferred embodiment of the invention the tab mount 39 is transversely mounted on a rounded hinge plate tab 38, which seats in a corresponding curved hood hinge seat 27, shaped in the hood hinge 20. The hood hinge seat 27 is disposed between a pair of spaced seat shoulders 28, which engage the hinge plate tab 38 against the bias of the spring 22 when the lens cap 30 is rotated or pivoted with respect to the hood 15. Accordingly, when the hinge plate tab 38 is seated in the hood hinge seat 27 as illustrated in FIGS. 6 and 7, the lens cap 30 is closed on the hood 15, as illustrated in FIG. 1. However, when the lens cap 30 is pivoted into the open configuration as illustrated in FIG. 2, the hinge plate tab 38 rotates from engagement and registration with the hood hinge seat 27 against the bias of the spring 22, to engage the seat shoulders 28, span the hood hinge seat 27 and again seat in the hood hinge seat 27, to facilitate 180 degree rotation of the lens cap 30 with respect to the hood 15.

In a most preferred embodiment of the invention, the lens cap 30 is characterized by a flat cap plate 36 having a lens cap slot 31 on the peripheral edge thereof, which lens cap slot 31 is defined by cap slot shoulders 32. The cap slot shoulders 32 further define an inwardly-extending lens cap flange 41, which as illustrated in FIG. 2. Furthermore, the body ring 17 of the hood 15 is provided with a companion peripheral body ring slot 18, which is terminated at spaced ring slot shoulders 19, in order to receive and register with the lens cap flange 41 when the lens cap 30 is closed on the hood 15, as illustrated in FIGS. 1 and 3. When the hood 15 and lens cap 14 are configured in the closed configuration as illustrated in FIGS. 1 and 3, the ring slot shoulders 19 are each seated against the cap slot shoulders 32 at a shoulder match line 33, respectively, the body ring slot 18 is seated against the corresponding lens cap flange 41 along a slot match line 34 and the hinge plate tab 38 is seated in the hood hinge seat 27 along a hinge match line 35.

Referring now to FIGS. 1, 2, 4 and 5A–5C, as heretofore described, the attachment ring 6 is threadibly attached to the camera lens 2 by engaging the external ring threads 7 and the cooperating internal lens threads 3. Furthermore, the hood 15 is rotatably seated in ratcheting relationship on the opposite end of the attachment ring 6 by engagement between the projecting ring tabs 11, defined by spaced ring slots 10 provided in the attachment ring 6 and companion tab slots 29, defined by tab slot shoulders 29a, located in the hood 15, as illustrated in FIG. 5A. The ring tabs 11 are each further provided with a bevelled face 12 and an opposite flat face 13, such that the hood 15 can be rotated in the direction of the arrow illustrated in FIG. 5B with respect to the attachment ring 6. This unidirectional rotation of the hood 15 is effected by engaging the respective bevelled faces 12 of corresponding ring tabs 11 with facing ones of the companion tab slot shoulders 29a in the hood 15 and rotating the respective ring tabs 11 into adjacent tab slots 29, as illustrated in sequence in FIGS. 5A–5C. It is understood that the hood 15 will not rotate with respect to the attachment ring 6 in the direction opposite to the direction of the arrow illustrated in FIG. 5B, since the faces 13 provided in the ring tabs 11 engage and seat against the corresponding tab slot shoulders 29a in the tab slots 29 and provide sufficient resistance to unthread the attachment ring 6 from the camera lens 2 when pressure is exerted in a direction opposite to the direction of the arrow. Referring again to FIGS. 1 and 2 of the drawings, this ratcheting facility allows the hood 15 to be rotated in the clockwise direction, for example, as the viewer is facing the lens cap 30, in order to position the open lens cap 30 in a direction away from the viewfinder of the camera and spaced from the user's fingers when pictures are taken.

It will be appreciated by those skilled in the art that the camera hood and lens cap 14 can be constructed of substantially any desired material, including metal such as aluminum, fiberglass and a "plastic" material, in nonexclusive particular. However, in a most preferred embodiment of the invention, both the hood 15 and the lens cap 30, as well as the attachment ring 6, are injection molded from a thermoplastic or alternative "plastic" material according to the knowledge of those skilled in the art. Furthermore, the camera hood and lens cap 14 and the companion attachment ring 6 can be molded or constructed to any desired dimensions, in order to facilitate installation and use on the lens or lens filter of substantially any camera.

It will be further appreciated that while the attachment ring 6 is designed to threadibly attach to the camera lens 2 by operation of the lens threads 3 provided on the camera lens 2, alternative means for securing the attachment ring 6 to the camera lens 2 may also be provided. Furthermore, if the camera lens 2 is fitted with a lens filter or filters (not illustrated) these filters are normally provided with threads which may be used to secure the attachment ring 6 thereon in the manner described above with respect to the camera lens 2.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A camera hood and pivoting lens cap for mounting on a camera, comprising a generally cone-shaped camera hood having a small end adapted for mounting on the camera and a large end defining a hood opening; hinge means provided on said camera hood at said hood opening; a lens cap shaped to substantially conform to said hood opening and a hinge plate provided on said lens cap, said hinge plate pivotally mounted on said hinge means; and bias means provided in said hinge means, said bias means engaging said hinge plate, whereby said lens cap is mounted in coplanar, pivoting relationship with respect to said camera hood for selective biased, coplanar closure over said hood opening in closed configuration and biased pivotal coplanar rotation outwardly of said hood opening in open configuration.

2. The camera hood and pivoting lens cap of claim 1 further comprising a hood slot provided in said large end of said camera hood and a lens cap flange provided in said lens cap for engaging said hood slot and seating said lens cap over said hood opening when said lens cap is pivoted into said closed configuration.

3. The camera hood and pivoting lens cap of claim 2 wherein said bias means further comprises a spring.

4. The camera hood and pivoting lens cap of claim 3 wherein said spring further comprises a coil spring.

5. The camera hood and pivoting lens cap of claim 1 further comprising tab means projecting from said hinge plate for engaging said hinge means and seating said lens cap over said hood opening in said closed configuration and locating said lens cap outwardly of said hood opening in said open configuration.

6. The camera hood and pivoting lens cap of claim 5 wherein said hinge means further comprises a hollow, generally cylindrically-shaped receptacle provided on said camera hood; said tab means further comprises a hollow tab mount projecting from fixed attachment to said hinge plate into said hollow receptacle; and further comprising fastening means extending into said hollow receptacle and engaging said hollow tab mount for securing said hinge plate and said lens cap to said camera hood and wherein said bias means further comprises a coil spring located in said hollow receptacle for selectively biasing said lens cap over said hood opening in said closed configuration and biasing said lens cap outwardly of said hood opening in said open configuration.

7. The camera hood and pivoting lens cap of claim 1 further comprising:
 (a) a hood slot provided in said large end of said camera hood and a lens cap flange provided in said lens cap for engaging said hood slot and seating said lens cap over said hood opening when said lens cap is pivoted into said closed configuration; and
 (b) an attachment ring having one end carried by said small end of said camera hood in rotatable, ratcheting relationship and the opposite end of said attachment ring adapted for attachment to the camera.

8. The camera hood with pivoting lens cap of claim 7 wherein said bias means further comprises a coil spring.

9. The camera hood and pivoting lens cap of claim 8 wherein said hinge means further comprises a hollow, generally cylindrically-shaped receptacle provided on said camera hood and a rounded seat shaped in one end of said receptacle; a hollow tab mount projecting from fixed attachment to said lens cap into said hollow receptacle; and fastening means extending into said hollow receptacle and engaging said hollow tab mount and said coil spring, for securing said lens cap to said camera hood against the bias of said coil spring and selectively biasing said lens cap over said hood opening in said closed configuration and biasing said lens cap outwardly of said hood opening in said open configuration.

10. The camera hood and pivoting lens cap of claim 9 further comprising a rounded tab provided in said tab mount for engaging said rounded seat in said one end of said receptacle and seating said lens cap over said hood opening in said closed configuration and locating said lens cap outwardly of said hood opening in said open configuration.

11. The camera hood and pivoting lens cap of claim 10 further comprising an attachment ring having one end carried by said small end of said camera hood in rotatable, ratcheting relationship and the opposite end of said attachment ring adapted for attachment to the camera.

12. A camera hood and pivoting lens cap combination for mounting on the lens of a camera, comprising a generally funnel-shaped camera hood having a small opening at one end for mounting on the lens and a large opening at the opposite end thereof; a hood slot provided in the peripheral edge of said opposite end of said camera hood; a pivoting lens cap shaped to substantially cover said large opening in closed configuration and a lens cap flange provided on the peripheral edge of said pivoting lens cap, said lens cap flange registering with said hood slot when said pivoting lens cap is pivoted into said closed configuration; a generally cylindrically hollow hinge provided on said camera hood, said pivoting lens cap engaging said camera hood in pivotal relationship; and bias means provided in said hinge, said bias means engaging said pivoting lens cap, whereby said pivoting lens cap is mounted on said camera hood in biased, coplanar, pivoting relationship with respect to said large opening for selective coplanar closure over said large opening in said closed configuration and coplanar pivoting outwardly of said large opening in open configuration.

13. The camera hood and pivoting lens cap combination of claim 12 wherein said hinge means further comprises a hollow, generally cylindrically-shaped receptacle provided on said camera hood; a hollow tab mount projecting from fixed attachment to said lens cap into said hollow receptacle; and fastening means extending into said hollow receptacle and engaging said hollow tab mount for securing said lens cap to said camera hood and wherein said bias means further comprises a coil spring located in said hollow receptacle for engaging said fastening means and selectively biasing said lens cap over said hood opening in saod closed configuration and biasing said lens cap outwardly of said hood opening in said open configuration.

14. The camera hood and pivoting lens cap combination of claim 12 further comprising an attachment ring having oneend carried by said small end of said camera hood in rotatable, ratcheting relationship and the opposite end of said attachment ring threaded for attachment to the camera.

15. The camera hood and pivoting lens cap combination of claim 14 wherein said hinge means further comprises a hollow, generally cylindrically-shaped receptacle provided on said camera hood; a hollow tab mount projecting from fixed attachment to said lens cap into said hollow receptacle; and fastening means extending into said hollow receptacle and engaging said hollow tab mount for securing said lens cap to said camera hood and wherein said bias means further comprises a coil spring located in said hollow receptacle for engaging said fastening means and selectively biasing said lens cap over said hood opening in said closed configuration and biasing said lens cap outwardly of said hood opening in said open configuration.

16. The camera hood and pivoting lens cap combination of claim 15 wherein said fastening means is a screw.

17. The camera hood and pivoting lens cap combination of claim 16 wherien said attachment ring further comprises ring threads provided in said one end for engaging companion lens threads provided in the camera lens and a plurality of ring tabs projecting from said opposite end of said attachment ring in spaced relationship, said ring tabs each provided with a bevelled shoulder and wherein said one end of said camera hood further comprises a plurality of tab slots for receiving said ring tabs, whereby said camera hood is rotatable in one direction in said ratcheting relationship responsive to engagement of said bevelled shoulder with said tab slots for positioning said pivoting lens cap in a desired configuration.

18. A camera hood and pivoting lens cap combination for mounting on a camera lens, comprising a generally cone-shaped camera hood having a first round opening at one end, with a plurality of tab slots provided in spaced relationship on said one end and a second round opening at the opposite end thereof, wherein said second round opening is larger thn said first round opening; an attachment ring having threads provided on one end thereof for threadable attachment to the camera lens and ring tabs provided on the opposite end of said attachment ring for engaging said tab slots in rotatable, ratcheting, non-detachable relationship; a hood slot provided in said opposite end of said camera hood; a round pivoting lens cap shaped to cover said large opening and a lens cap flange provided on the periphery of said pivoting lens cap, said lens cap flange provided in registration with said hood slot when said pivoting lens cap is closed on said camera hood; hinge means provided on said camera hood, said hinge means receiving said pivoting lens cap and joining said pivoting lens cap to said camera hood in pivotal relationship; and bias means provided in said hinge means and engaging said pivoting lens cap, whereby said pivoting lens cap pivotally closes over said large opening in coplanar relationship with respect to said second round opening in closed configuration and outwardly of said second round opening in open configuration.

19. The camera hood and pivoting hood cap combination of claim 18 wherein said hinge means further comprises a hollow, generally cylindrically-shaped receptacle provided on said camera hood and a rounded seat shaped in one end of said receptacle; a hollow tab mount projecting from fixed attachment to said lens cap into said hollow receptacle; and fastening means extending into said hollow receptcle and engaging said hollow tab mount for securing said lens cap to said camera hood and wherein said bias means further comprises a coil spring located in said hollow receptacle for engaging said fastening means and selectively biasing said lens cap over said hood opening in said closed configuration and biasing said lens cap outwardly of said hood opening in said open configuration.

20. The camera hood and pivoting lens cap combination of claim 19 further comprising a rounded tab provided in said tab mount for engaging said rounded seat in said receptacle and seating said lens cap over said hood opening in said closed configuration and locating said lens cap outwardlly of said hood opening in said open configuration.

21. The camera hood and pivoting lens cap of claim 20 wherein said attachment ring further comprises ring threads provided in said one end for engaging companion lens threads provided in the camera lens and a plurality of ring tabs projecting from said opposite end of said attachment ring in spaced relationship, said ring tabs each provided with a bevelled shoulder and wherein said one end of said camera hood further comprises a plurality of tab slots for receiving said ring tabs, whereby said camera hood is rotatable in one direction in said ratcheting relationship responsive to engagement of said bevelled shoulder with said tab slots for positioning said pivoting lens cap in a desired configuration.

* * * * *